United States Patent [19]

De Chiffre et al.

[11] Patent Number: 4,828,618

[45] Date of Patent: May 9, 1989

[54] PROCESS FOR MAKING AERATED CONCRETE

[76] Inventors: Chiara De Chiffre, Villaggio, Brugherio 67, 200 Brugherio (Milano); Enrica De Chiffre, Villaggio Brugherio 67, 20067 Brugherio (Milano), both of Italy

[21] Appl. No.: 920,982

[22] PCT Filed: Jan. 30, 1986

[86] PCT No.: PCT/IT86/00010

§ 371 Date: Oct. 3, 1986

§ 102(e) Date: Oct. 3, 1986

[87] PCT Pub. No.: WO86/04574

PCT Pub. Date: Aug. 14, 1986

[30] Foreign Application Priority Data

Feb. 8, 1985 [IT] Italy ................................ 19454 A/85

[51] Int. Cl.$^4$ ...................... C04B 22/04; C04B 14/38; C04B 16/02

[52] U.S. Cl. ........................................ 106/87; 106/93; 106/99

[58] Field of Search ...................... 106/86, 87, 88, 99, 106/93

[56] References Cited

U.S. PATENT DOCUMENTS

| | | | |
|---|---|---|---|
| 3,236,925 | 2/1966 | Urmston | 106/95 |
| 3,926,650 | 12/1975 | Lange et al. | 106/90 |
| 4,058,405 | 11/1977 | Snyder et al. | 106/87 |

FOREIGN PATENT DOCUMENTS 610826  6/1978  U.S.S.R. ................................ 106/86

*Primary Examiner*—William R. Dixon, Jr.
*Assistant Examiner*—Ann M. Knab
*Attorney, Agent, or Firm*—Michael J. Striker

[57] ABSTRACT

A process for making aerated concrete by pretreating aggregates prior to incorporation into a cement slurry is disclosed. The pretreatment involves addition of reactive agents, such as aluminum powder and cellulose derivatives, in an aqueous dispersion to common cement additives such as sand, fibers, etc., and drying. Upon use in a cement slurry to form concrete, the reactive agents generate gases on the aggregates which form macrovoids uniformly distributed throughout the concrete.

2 Claims, No Drawings

PROCESS FOR MAKING AERATED CONCRETE

PRESENT STATE OF THE ART

It is known that absorption of air by concrete, and its expansion by formation of macrovoids, provides considerable advantages such as greater lightness, increased resistance to frost, better heat insulation and protection from noise, dehumidification of brickwork helped by aerated plastering, lower retention of humidity in new buildings.

It is also known that the percentage of air to absorb will vary according to the purposes to be fulfilled.

Distribution of the macrovoids throughout the concrete must however be as uniform and regular as possible so that the benefits brought by their function shall be equally effective at all points.

Various additives are used to form macrovoids, such as: resinous acids and their salts, fatty acids and their salts, alkyl-aryl sulphonates, alkyl sulphates, phenolethoxylates, ionic and non-ionic surface-active agents generally; reducing metal powders able to develop gaseous hydrogen in basic aqueous environments (aluminum in most cases).

Use is made of different processes. During mixing, the following are put into the mixer:

(a) surface-active or reactive additives, or both,
(b) mixtures in powder form consisting of aggregates and additives,
(c) an aqueous dispersion, in foamy form, of surface-active and reactive substances.

It is clear however that these processes will not alone ensure perfectly uniform dispersion of the additives throughout the whole mixture and consequently uniform distribution of the macrovoids.

If additives are put into the mixer singly, quantities are in fact usually limited so that they can be uniformly distributed.

Further, reaction times are negative in their effects partly because these reactions tend to develop in the mixer itself while it is intended that they should mainly occur when the concrete is in place so that the resulting microvoids form when the concrete will be no longer disturbed.

When mixtures of aggregates and powdered additives are used the differing specific gravities of the component materials tend to impede achievement of uniformity from the time when preparation of the mixing begins.

In the same way the problem of uniform distribution of the macrovoids cannot be solved by prior transformation of a dispersion of additives in foam because the foam itself is insubstantial.

If, according to the purpose for which the concrete is made, differing degrees of aereation (and different sizes of macrovoids) are required, the systems considered do not facilitate the making up of various proportions, even if always limited and therefore difficult to measure or weigh out. Where mixtures contain various types of additives problems arise of homogenizing and stabilizing it if it is fluid.

If the mixture consists of powders, the larger particles of materials will inevitably sift down to the bottom in time. This present invention eliminates or lessens the above drawbacks and, further, offers considerable advantages as will be explained below.

DESCRIPTION OF THE INVENTION

Subject of the invention is a process for making aerated concrete in accordance with which a solution of a hydro-soluble cellulose derivate is prepared in water and to this is added a surface-active agent and a metal powder reactive in a basic environment.

The dispersion so obtained is mixed into, and evenly absorbed by inert materials such as sand, fibers or whatever else is to be mixed with the cement or other binders and the water.

A drying process is then carried out by mixing under heat so as to achieve actual modification of the above aggregates by absorption or piling together.

The aggregates thus treated are put into the cement mixer together with the cement or other building material and the whole is mixed dry for as long as necessary for a perfectly uniform distribution of the ingredients, water being added during the movement and mixing done for the length of time needed for them all to be completely wetted.

Production of gas, during mixing, generated by the reactive powder will cause formation of air bubbles, practically grain by grain or fiber by fiber, absorbed by the mass of material and therefore of macrovoids distributed with maximum uniformity.

The liquid or pasty surface-active foaming agents that assist distribution and stabilization of the reactive powder on the grains of sand or on the fibers and contribute to formation of the macrovoids, are ionic, non-ionic or both associated together.

In one type of execution the reactive powder is aluminum which, in the presence of water and in a basic environment, develops hydrogen, the hydro-soluble cellulose derivate is carboxymethylcellulose while the surface-active agent is a sulphonate.

The quantity of cellulose derivate that ensures mechanical stability of the metal to abrasion and plasticity of the mixture, is in relation to the surface area of the aggregates while the type of said substance is in relation to the speed of formation of the desired dispersion.

By making a suitable selection of the various additives, such as reactive powder, cellulose derivate, surface active agent, and others, mixtures can be prepared already complete with cement or with any other binders or plasticizers, so that only water need be added to the material in the cement mixer.

By a suitable choice of the above elements, waterproofing properties, in addition to the macrovoids, can also be given to the concrete.

By making a suitable choice of the various elements, the process can be applied using any type of cement, lime or binder generally speaking.

If the treatment can be carried out rapidly by using a suitable type of machine, basic types of aggregates and surface-active agents can be employed to stop oxidation of the metal powders which cannot proceed in the absence of water.

ADVANTAGES

Additive properties can be established very easily and with great accuracy.

The additives are evenly distributed throughout the cement with consequently uniform distribution of macrovoids. Difficulties caused by varyious specific weights of the components and their different behaviours, can also be overcome.

As results are constantly the same, practically identical reproduction of the characteristics becomes possible in all varieties of composition.

During transport, in the pre-mixing stage of dry cement and aggregates for preparation of the mixture, the cellulose derivate protects the treated aggregates from phenomena of abrasion.

By means of the process described, it is especially possible to obtain optimum formation of:

castings of concrete or reinforced concrete, de-humdifying, noise-deadening, heat-insulating cement plastering protected against the effects of frost.

As the applications of the invention have been described as examples only not limited to these, it is understood that every equivalent application of the inventive concepts explained, and every product executed and/or operating in accordance with the characteristics of the invention, will be covered by its field of protection.

We claim:

1. A process for making aerated concrete, comprising the steps of:

pretreating aggregates composed of at least grains of sand and fibers with a reactive agent additive consisting of aluminum powder which reacts in a basic aqueous environment to produce a gas, by preparing an aqueous solution of a hydrosoluble cellulose derivative, adding reactive aluminum powder and a surface active agent thereto so as to obtain a dispersion, mixing the aggregates into the dispersion, and drying by heat during the mixing of the aggregates into the dispersion; and mixing the pretreated aggregates with a binder and water to produce aerated concrete in which a basic aqueous environment is created that causes the reactive agent additive to react so as to produce a gas substantially on each of the grains and fibers and thereby cause formation of a uniform distribution of macrovoids throughout the concrete.

2. A process for making aerated concrete, comprising the steps of:

pretreating aggregates composed of at least grains of sand and fibers with a reactive agent additive consisting of aluminum powder which reacts in a basic aqueous environment to produce a gas, by preparing an aqueous solution of a hydrosoluble cellulose derivative, adding reactive aluminum powder and a surface active agent thereto so as to obtain a dispersion, mixing the aggregates into the dispersion, and drying by heat during the mixing of the aggregates into the dispersion; and mixing the pretreated aggregates with a cement binder and water to produce aerated concrete in which a basic aqueous environment is created that causes the reactive agent additive to react so as to produce a gas substantially on each of the grains and fibers and thereby cause formation of a uniform distribution of macrovoids throughout the concrete.

* * * * *